United States Patent [19]

Jouwsma

[11] Patent Number: 4,616,505
[45] Date of Patent: Oct. 14, 1986

[54] FLUID FLOW MEASURING DEVICE

[75] Inventor: Wijbren Jouwsma, Lochem, Netherlands

[73] Assignee: Bronkhorst High-Tech B.V., Netherlands

[21] Appl. No.: 611,598

[22] Filed: May 18, 1984

[30] Foreign Application Priority Data

May 18, 1983 [NL] Netherlands ................. 8301765

[51] Int. Cl.$^4$ ............................................. G01F 1/68
[52] U.S. Cl. ................................................. 73/204
[58] Field of Search ..................................... 73/204

[56] References Cited

U.S. PATENT DOCUMENTS

| | | | |
|---|---|---|---|
| 2,729,976 | 1/1956 | Laub . | |
| 3,336,804 | 4/1967 | Poppendiek et al. | 73/204 |
| 3,438,254 | 4/1969 | Seeley | 73/204 |
| 3,931,736 | 1/1976 | Olmstead | 73/204 |
| 4,160,969 | 7/1979 | Holmes . | |
| 4,335,605 | 6/1982 | Boyd . | |
| 4,471,647 | 9/1984 | Jerman et al. | 73/23.1 |

FOREIGN PATENT DOCUMENTS

| | | |
|---|---|---|
| 0021291 | 1/1981 | European Pat. Off. . |
| 7403639 | 2/1974 | France . |
| 7927281 | 11/1979 | France . |
| 8301765 | 12/1947 | Netherlands . |

OTHER PUBLICATIONS

IBM Technical Disclosure Bulletin, vol. 21, No. 8, (1979), Malin et al.

Stevenage (1981) Medical and Biological Eng. & Computing 19:662-664.

Huijsing (1982) IEEE Transactions on Election Devices, vol. ED-29, No. 1, pp. 133-136.

Primary Examiner—Herbert Goldstein

[57] ABSTRACT

Fluid flow measuring device comprising elements positioned on the outer wall of a thermally conductive measuring channel and thermally insulated from the environment by an insulating body. The sensor elements can be heated for creating temperature gradient as a function of the fluid flow rate, which temperature gradient can be converted into and electrical measuring signal using a bridge circuit. The bridge circuit comprises four sensor elements which two by two are connected in series and are positioned onto the fluid measuring channel such that of each series circuit one element is positioned on a first section of the fluid measuring channel upstream in relation to a second section of the fluid measuring channel on which the other element of the respective series circuit is positioned, whereby the downstream end of each series circuit is connected to the upstream end of the respective other series circuit, and the electrical measuring signal is available at the junctions within said series circuits. The sensor elements are formed by thin or thick film resistors or integrated semiconductors on the electrically insulating fluid measuring channel respectively on a thin insulating layer on the electrically conducting fluid measuring channel.

29 Claims, 13 Drawing Figures

FLUID FLOW MEASURING DEVICE

The invention relates to a fluid flow measuring device for measuring the flow rate of a fluid flowing through a thermally conducting fluid measuring channel, comprising sensor elements positioned at the outside wall of the measuring channel, which elements can be heated for creating a temperature gradient as function of the fluid flow rate, which temperature gradient can be converted into an electrical measuring signal by means of a measuring circuit.

Such a fluid flow measuring device is known from the U.S. Pat. No. 3,938,384. In this known fluid flow measuring device the sensor elements are embodied as temperature sensitive resistance wires, which are wound around the outer surface of the tubular fluid flow measuring channel and are embedded into an insulating material. The resistors are heated as result of the electrical current through said resistors and if a fluid is flowing through the fluid measuring channel then a temperature gradient is created between both resistors, which gradient is directly proportional to the fluid flow rate. Because of said temperature gradient a voltage will be generated at the measuring terminals of a resistance bridge in which said resistors are connected.

As appears from the description of said U.S. Pat. No. 3,938,384 the dimensions of the fluid flow measuring device are very small. In an embodiment the diameter of the fluid measuring channel is 0.014 inch–0.3556 mm and each of said resistors is wound around the fluid flow measuring channel over a length of 0.2 inch–5.08 mm. That implies that hair thin resistance wires have to be wound onto an also very small measuring tube to realize both sensor resistors. It will be clear that special tools and very great skill is needed to fabricate such a fluid flow measuring device. The chance that the wire will break during the winding operation, that the windings are not formed uniformly, that a non equal mechanical tension is created in the various windings which may lead to local distorsion and to changes in the resistance during operation etc. are certainly not inconceivable. For mass fabrication furthermore special machines have to be developed, significantly increasing costs. A fluid flow measuring device of this type will therefore be relatively expensive.

Furthermore the response time for fluid flow meters of this type is relatively long. For an embodiment a time of twelve seconds is indicated to reach 98% of the ultimate measuring value after a stepwise change in the fluid flow rate of 20% to 100%.

An object of the invention is now to eliminate said disadvantages and to provide a fluid flow measuring device of the above mentioned type, which can be fabricated in a relatively cheap and reliable way and has a relatively fast response. In agreement with said object the fluid flow measuring device of the type mentioned above is now characterized in that the sensor elements are in integrated form positioned onto a thin substrate of a good heat conducting and electrically insulating material, which substrate is attached to the outer wall of the fluid flow measuring channel. There are at least two temperature sensitive resistance elements, one of which is positioned upstream from the other. An electrical signal is generated representative of the temperature differential between the two resistance elements (and of fluid flow) when the system is heated by a heating means.

By using sensor elements which are in integrated form positioned onto a substrate the actual fabrication steps are restricted on the one hand to attaching the substrate to the channel wall and on the other hand to integrating the sensor elements onto said substrate, for which last step various well known methods can be used. Because as result of this configuration also a fast heat transfer to the sensor elements is realized the response will be very fast.

It is remarked that in the European Patent Application 0,021,291 a fluid flow measuring device is described on the type which shows some similarity with the type described in the above mentioned U.S. Pat. No. 3,938,384. In said known fluid flow measuring device both sensor resistors are attached in the form of thin resistance layers onto a thin substrate. Said thin substrate is, preferably after realizing at least a local stiffening, located within the flowing fluid, i.e. within the measuring channel and not as according to the invention onto the outer wall of the fluid flow measuring channel. Because of the relatively small dimensions of both the channel as well as the thin film resistors the fabrication of this known fluid flow measuring device will cause various problems. By attaching the sensor elements according to the invention in integrated form onto the outer wall of the fluid flow measuring channel said problems are for the major part eliminated and furthermore there is no chance that the fluid will cause deterioration of the components of the fluid flow measuring device. Also contamination by said components into the fluid flow is eliminated.

Furthermore, because of the presence of the sensor elements within the fluid flow channel itself, the fluid flow through the channel of said known fluid flow measuring device will be influenced to a certain extent which will have an adverse influence onto the accuracy of the measurement. Furthermore measures have to be taken to make the connections with the sensor elements through the wall of the fluid flow channel.

In both above mentioned known fluid flow measuring devices the sensor elements are heated as result of an electrical current through the sensor elements themselves. However, it is also possible to use separate heating elements in said fluid flow measuring device. According to the invention in that case it is preferred that the separate heating elements are also positioned onto the substrate in an integrated form. In this connection reference is made to the U.S. Pat. No. 2,994,222, in which a fluid flow measuring device is described comprising two sensor resistors as well as a heating resistor located adjacent one of said sensor resistors. Both the sensor resistors as well as the heater are formed out of wires of a suitable resistance material which wires are wound onto the thermically conducting fluid flow measuring channel. Said known fluid flow measuring device however has the same disadvantages as indicated above for the U.S. Pat. No. 3,938,384.

To simplify the peripheral measuring circuit it is preferred that at least part of the components of said measuring circuit are positioned directly onto the substrate. In general the realisation at least part of the components of the measuring circuit into an integrated form directly onto the substrate together with the sensor elements and, if present, the heating elements, will encounter no or only minor problems and therefor a simplification of the fabrication of the fluid flow measuring device as a whole can be realized.

In the above description reference is made to publications in which fluid flow measuring devices are described comprising sensor elements and (if present) heater elements in the form of resistors. However, it is also possible to apply the principle of the invention to fluid flow measuring devices in which the sensor elements and, if present, the heater elements are embodied as semiconductors. In that case the sensor elements and, if present, the heater elements are according to the invention realized in the form of integrated semiconductors in chip form onto the substrate.

In this connection reference is made to the direction sensitive fluid flow measuring device described in the Dutch Patent Application /6.09696. In this known fluid flow measuring device the sensor elements consist of temperature sensitive transistors of which, viewed in the measuring direction, at least one is present at the front end of the chip and at least one is present at the rear end of the chip. When said chip is heated the flowing fluid will encounter first of all the transistor at the front of the chip, and will be heated when flowing along the chip. If the fluid flow reaches the rear transistor then the temperature of said rear transistor will reach a higher value than the temperature of the front transistor which will cause a difference in output signal of the front and rear transistor, which difference will in general increase with increasing flow rate. As is indicated in said Dutch Patent Application there is a linear relation between the square of the measured difference voltage and the flow velocity of the flowing fluid.

In said known direction sensitive fluid flow measuring device furthermore a resistor or power transistor functioning as heat source can be integrated onto the chip.

In contrast with the fluid flow measuring device according to the underlaying application the chip of the known fluid flow measuring device is positioned into the fluid flow, in other words within the measuring channel, using a holder device. In some application there are no objections for bringing the component side of the chip into contact with the fluid to be measured, however, if fluids have to be measured which for instance have a very high viscosity or which are very corrosive, then it is preferred to direct that side of the chip, onto which the heat source as well as the sensor elements are present, to the holder element of the chip and to expose only the back side of the chip to the fluid.

Furthermore from the U.S. Pat. No. 3,992,940 a fluid flow measuring device is known in which the sensor and heater elements are created on two drips which are attached to a carrier plate positioned within the fluid measuring channel. The various input and output lines to respectively from the chips are extending over said carrier plate and through the channel wall to the exterior.

A disadvantage of said known fluid flow measuring device is that the chip(s) forming part of said device have to be brought into contact with the fluid to be measured by means of a holder element which is not always possible in a very simple way. The assembly of the chips in or onto the holder elements and thereafter the installation of said holder at the measuring position is very awkward and time consuming and results therefore in significant costs.

According to a preferred embodiment of the underlaying application the semiconductors are in chip form adhered to the fluid measuring channel whereby the bonding or adhesive layer together with the chip material forms said substrate. That results into a significant simplification of the fluid flow measuring device, and for the fabrication of said fluid flow measuring device it is only necessary to adhere commercially available semiconductors in chip form onto the fluid flow measuring channel by means of a bonding or adhering process and thereafter connect the chips to the measuring circuit.

A specially simple configuration and also a very simple method for fabricating such a configuration is obtained in case the substrate forms part of the wall of the fluid measuring channel. Conceivable thereby is for instance a substrate in the form of a annular segment which with very simple means can be installed into the channel as part of the fluid flow measuring channel. It is furthermore possible to think of a fluid flow measuring channel with rectangular cross section whereby the substrate forms part of one of the flat walls thereof and can be installed as such in a very simple way.

According to a preferred embodiment for fabricating a fluid flow measuring device according to the invention the sensor elements are realized onto a thin substrate of good heat conducting and electrically insulating material in the form of thin or thick film resistors of temperature sensitive material, whereafter the substrate is attached to the walls of the fluid channel, for instance by means of bonding or adhesive agents. For instance thin plates of glass or aluminium oxide can be used for the substrate. However, it is also possible to use a plastic foil which in a continuous process is printed with a suitable pattern of resistance material whereafter, after dividing said film into separate substrates, the printed films are to the outer surface of the fluid measuring channel.

However, according to a further preferred method it is also possible to provide the substrate in the form of a thin layer of electrically insulating and good heat conducting material onto the outer wall of the fluid measuring channel made of a good heat conducting material, whereafter the sensor elements, for instance in the form of thin or thick film resistors of temperature sensitive material are provided onto the provided substrate. It is for instance possible to use an enamel process for providing a thin substrate, onto which thereafter the resistance tracks are realized in the desired pattern using a screen printing technique.

According to a further development of the invention the fluid measuring channel is at least partly formed into the substrate itself. For that purpose the substrate can have for instance at one side a groove or excavation, which after positioning a closing element to that side of the substrate determines the fluid flow measuring channel. In this way a very simple construction is obtained. If furthermore the connection between the closing element and the substrate side containing the groove or the excavation is embodied releasible then the fluid flow measuring device can be taken apart very easily for instance for maintenance or cleaning purposes or for eventually changing filter elements or laminar flow elements present within the fluid measuring channel without the necessity to remove the sensor and/or heating elements from the positions in which they are attached.

It is also possible to provide the substrate with a through going passage functioning as fluid measuring channel. Such an embodiment, especially suited for fluid measuring channels with relatively small diameter, can be realized in an accurate and simple way by fabricating the through going passage using a laser beam. When furthermore a semiconductor substrate is used then after integrating the necessary sensor and/or heater elements into or onto the substrate in principle only one further fabrication step is necessary to form a totally integrated component including the measuring channel. If furthermore the complete measuring circuit is integrated onto the substrate then in a relatively small number of fabrication steps a completely integrated fluid flow measuring device is obtained.

It is furthermore possible to realize the heater and/or sensor elements and eventually further components of the measuring circuit into a thin layer onto a flat substrate and to position thereafter an U-shaped element against the substrate such that the then closed space between the U-formed element determines the fluid measuring channel.

In all cases a configuration can be selected such that in the ultimate configuration the thin layer is present at the outer wall of the fluid measuring channel. Very good results can be obtained specially when the substrate and therewith the channel wall is very thin resulting into a good heat transfer and in a fast response onto heat changes.

As is already remarked also further components can be positioned within the thin layer additional to the heater means and/or the sensor elements. Especially an embodiment in which the complete measuring circuit is integrated into said layer will result into a very compact fluid flow measuring device which can be fabricated in a relatively small number of steps in a reproducable way, which measuring device after connection to a power supply source and to an indication unit is ready for use.

Various methods are already known in the integrated circuit technique, which can be applied with good succes within the scope of the invention, all this dependent onto the used sensor elements and the used heater elements, such as thick or thin layer fabrication methods, whereby for instance part of the components of a circuit are fabricated by evaporating, sputtering or vacuum deposition in one or more layers, thereby not covering the bonding areas which are used for connection with other components.

In none of the prior art publications the problems, caused by a varying background or ambient fluid temperature are recognized. In all the publications a constant fluid temperature is assumed. However, in practice the temperature will certainly not be constant and because the sensor elements and, if present, the heater elements, are made of a material of which the specific resistance value will increase, problems are encountered in the known fluid flow measuring devices because of a constantly drifting zero adjustment of the measuring bridge circuit. The applicant now has recognized that these problems can be eliminated or at least reduced in a significant way in case the bridge circuit is made of four sensor elements which two by two are connected in series and are positioned onto the fluid measuring channel such that from each series circuit one lement is positioned to a first section of the fluid measuring channel upstream in relation to a second section of the fluid measuring channel onto which the other elements of the respective series circuits are positioned, whereby the downstream end of each of the series circuit is connected to the upstream end of the respective other series circuit and the electrical measuring signal is available at the junctions of said series circuits. Because now all the sensor elements are maintained at the same temperature, which temperature may be a varying temperature, the resistance values of each of said sensor elements is affected in the same way by said varying temperature with the result that the zero adjustment of the bridge will not be affected.

Especially in combination with sensor elements of the above mentioned type, which sensor elements are formed as resistance elements in the form of thin or thick layers on an electrically insulating fluid measuring channel respectively on a thin isolating layer on an electrically conducting fluid measuring channel or are formed as transistors which are in integrated form provided on a thin substrate of good heat conducting and electrically insulating material, which substrate is attached to the outerwall of the fluid measuring channel, a very fast response is obtained without the necessity to take extensive measures for compensating and a drift in the zero adjustment of the bridge circuit.

The applicant has furthermore recognized than at increasing background fluid temperatures the heat losses from the sensor elements and/or the heater elements to the environment through the insulating body will increase and those increasing heat losses will result into a drift of the zero adjustment of the bridge circuit, which drift will be larger as the own fluid temperature increases. To eliminate said problem the invention now provides a fluid flow measuring device.

Fluid flow measuring device in which either the sensor elements, functioning also as heater elements, or the separate sensor elements, functioning also as heater elements, or the separate heater elements are embodied as resistance elements, through which resistance elements in the first instance a constant electrical current is supplied, characterized in that the resistance material of said resistance elements as well as the insulation value of the insulating body are selected such that the increase of heat released by said element with increasing resistance value of said element caused by an increase of the background fluid temperature will be at least approximately compensated by the increase of the heat losses through said insulating body.

So far measures are described to improve the heat transfer between the fluid on the one hand and the sensor/heater element on the other hand. Important thereby are thin insulating layers between the actual sensor elements and heater elements as well as a large contact area between said sensor elements and heater elements on the one hand and the fluid flow measuring channel respectively the thereon deposited insulating layer on the other hand. A further increase in the response time wil be realized in case the whole combination of sensor elements and if present heater element is covered by an insulating body reducing thereby the heat losses to the environment. The use of such an insulating body for insulating the sensor elements and heater elements from the environment is already described in the U.S. Pat. No. 3,938,384. In the therein described device an insulating body with an open cell structure is used and the description of said U.S. Patent mentions as suitable materials polystyrene, polyurethane foam, foamed polyethylene, foamed polypropylene and the like. All said foam materials of open cell construction are however not suited for use at higher temperatures in the range of $\pm 100°$ C. because at higher temperatures the foam structure will collapse and the foam material will completely lose its insulating properties. That implies that the fluid flow measuring devices of the type described in said U.S. Patent are not suited for measuring the flow of fluids having a background temperature above 100° C.

In many industrial areas however there is an increasing need for fluid flow measuring devices which are able to measure the flow of fluids of which the background temperature is within the range of 100°–1000° C. According to the invention now the insulating body is at least present partly fabricated using natural fibres such as glass wool fibres or rockwool fibres.

The invention will now be explained in more detail with reference to the attached drawings.

FIGS. 5a, 5b, 6a, 6b, 7a, 7b, and 7c illustrate embodiments which are tested in practice.

Figure 8:
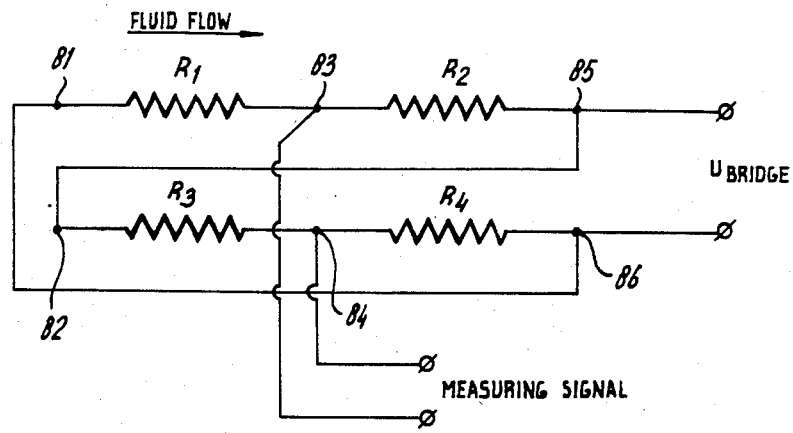

FIG. 8 is a schematic diagram of electrical components.

Figure 9:
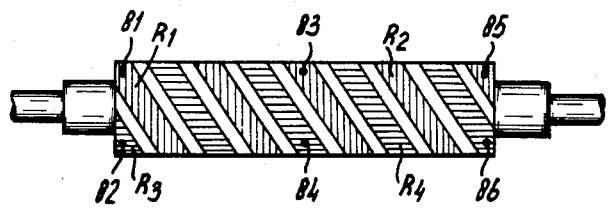

FIG. 9 illustrates a measuring tube having the connecting points indicated in FIG. 8.

Figure 1:
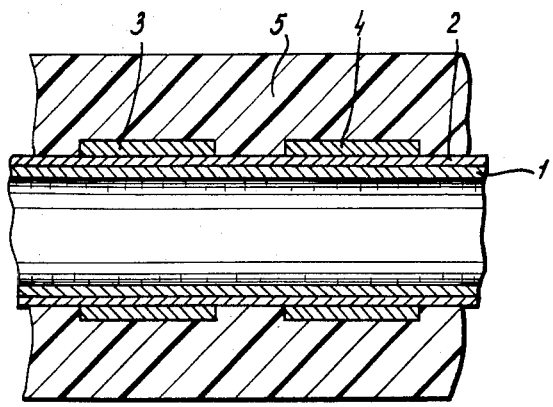
FIG. 1 illustrates a cross section through a measuring tube, comprising resistor elements functioning both as sensor as well as heater element.

FIG. 1 illustrates a cross section through a measuring tube 1, which is for instance made of aluminium or another suitable material.

Said aluminium tube carries a layer 2 of insulating material, for instance made of aluminium oxide or an oxide of another metal from which the measuring tube is made, or another insulating layer. Onto said layer of aluminium oxide 2 a layer of heat sensitive resistance material is deposited, for instance using a chromium, nickel alloy, in areas 3 and 4. In FIG. 1 said layers 3 and 4 are only illustrated schematically. It will be clear that the layers 3 and 4 can be embodied into spirally shaped windings around the tube between a starting point and an end point or a layer which is in a meander shape deposited onto this tube. The invention however is not restricted to said two possibilities but all kinds of other solutions, which are considered as known to the expert in the field of deposited resistors, will be applicable within the scope of the invention.

The measuring tube 1 carrying the resistor elements 3 and 4 can for instance be applied in a circuit as described in the U.S. Pat. No. 3,938,384. Because of the direct contact between the resistor elements and the measuring tube an increased sensitivity and a faster response of the fluid flow measuring device is obtained in case the invention is applied.

For depositing the resistance layers 3 and 4 material can be evaporated out of the gas phase, material can be deposited out of the liquid phase, or a so called sputter technique in high vacuum can be used. All these techniques are themselves known to the expert in this field and therefore no further details will be provided. Furthermore the insulating body 5 is schematically illustrated in FIG. 1. Said insulating body is preferably made of natural fibres such as glasswool fibres or rockwool fibres and may be enclosed within for instance an aluminium body on the one hand to prevent damaging of the fibre structure and on the other hand to prevent any air flow through th fibre structure thereby increasing the insulation value of the insulating body.

It is remarked that in principle in all the embodiments illustrated in the FIGS. 2–7 an insulating body of this type will be used, however, for the sake of clearness these bodies are not illustrated in the FIGS. 2–7.

Figure 2:
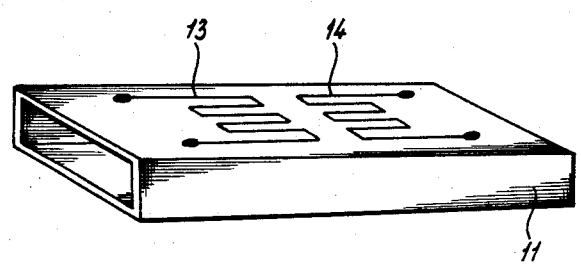
FIG. 2 illustrates a measuring tube in another embodiment.

FIG. 2 illustrates another embodiment of the device according to the invention. In this case the measuring tube has a rectangular cross section so that the components, forming part of the measuring device, can be attached to a flat surface which has certain advantages relating to the fabrication of the device. The resistance elements 13 and 14 are only illustrated schematically onto the tube 11. It will be clear that the same fabrication techniques as mentioned in relation to FIG. 1 can also be used in FIG. 2. It will furthermore be clear that eventually further components can be connected directly to the resistance elements which are made into a thin layer technique without the necessity to use long connections to a separate circuit. In that case a hybrid circuit is realized with all the inherent advantages thereof.

Figure 3:
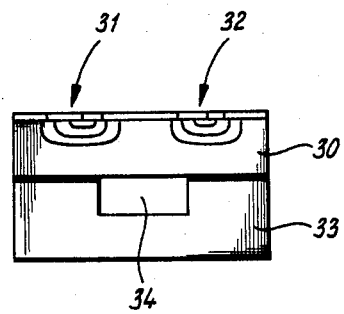
FIG. 3 illustrates an embodiment with a semiconductor substrate.

FIG. 3 illustrates a configuration of which the heater and/or sensor elements are integrated into the upper thin layer of a semiconductor substrate 30. Schematically two transistors 31 and 32 are indicated, but it will be clear that the number, the type, the location and the embodiment of the integrated components may differ. A U-shaped element 33 is positioned against the under side of said substrate 30 such that between the substrate 30 and said U-shaped element 33 a channel 34 is defined functioning as measuring channel.

It will be clear that also an inversely shaped configuration is conceivable in which the substrate is formed into a U-shape or is at one side provided with a groove, whereby the excavation in the U-shape respectively the groove is closed by a flat element.

It is furthermore possible, taking the positioning of the integrated components into account, to locate the U-shaped element 34 against the upper surface of the substrate 30 such that the integrated components will be positioned onto the inner wall of the measuring channel resulting into an even better heat transfer and an even faster response.

Figure 4:
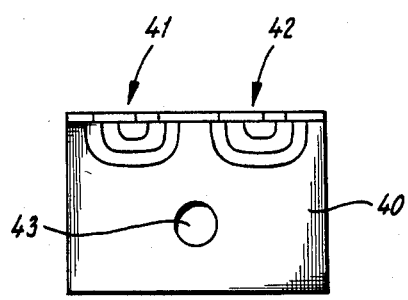
FIG. 4 illustrates a further development of the embodiment of FIG. 3.

Finally FIG. 4 illustrates an embodiment comprising a substrate 40, in which again schematically and only as indication the transistors 41 and 42 are illustrated. In this case a passage 43 is realized into the substrate, which passage functions as measuring channel. Such an embodiment is especially suited as measuring circuit in combination with a laminar measuring channel, in which case the dimensions of the passage should be selected such that said passage can function as laminar flow channel.

In FIGS. 5a, 5b, 6a, 6b, 7a, 7b and 7c a number of embodiments are illustrated which are tested in practice.

Figure 5A:
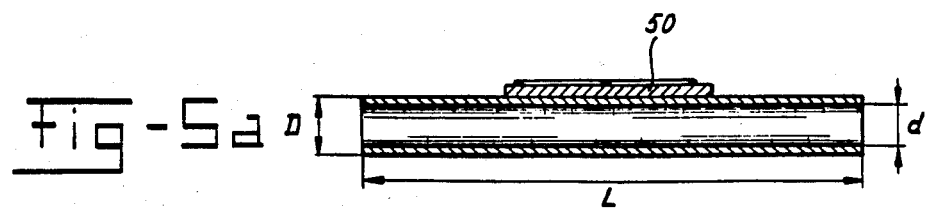
Figure 5B:
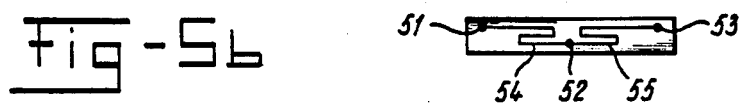

FIGS. 5a and 5b illustrate a measuring channel comprising a stainless steel tube having a length L of 60 mm, an outer diameter D of 2 mm and an inner diameter of d of 1.9 mm. Onto said tube an $Al_2O_3$ substrate 50 carrying a sensor pattern of nickel material is adhered, bonded or soldered. FIG. 5b illustrates the pattern of sensor elements to the substrate. A nickel path 54 extends between the terminal 51 and the terminal 52 and a nickel path 55 extends between the terminal 52 and the terminal 53. Both paths can be configured in a spiral shape. The response time for attaining 98% of the ultimate value after a stepwise change in the fluid flow rate from 20% to 100% was in this embodiment ±1 sec.

Figure 6A:
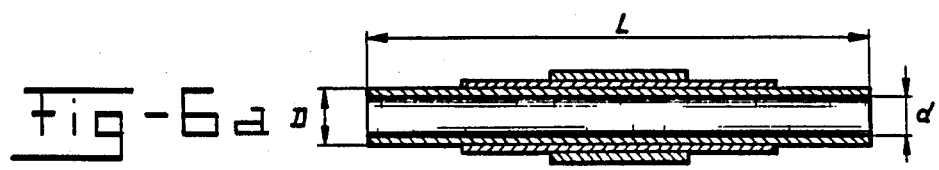
Figure 6B:
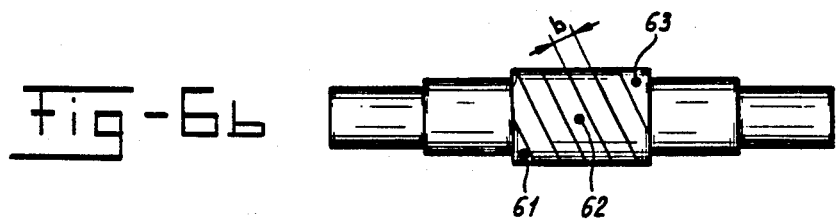

FIGS. 6, 6a and 6b illustrate a second embodiment which was tested in practice. In this embodiment the measuring channel is formed by a stainless steel tube having a length L of 60 mm, an outer diameter of 0.2 mm and an inner diameter of 1.9 mm. Along part of its length this stainless steel tube was covered by an insulating layer for which in one of the embodiments $Al_2O_3$ was used, but for which however also other insulating materials can be used. Various known methods are used for realizing said insulating layer, amongst other sputterings, vacuum deposition and deposition within a galvanic bath. The thickness of the insulating layer was 10 micron. Onto said insulating layer a nickel layer was deposited having a thickness of 2-10 micron. Also for depositing said nickel layer a known method such as sputtering, vacuum deposition or deposition within an galvanic bath can be used. As is clearly indicated in FIG. 6b there after a spirally shaped nickel path with the connecting terminals 61, 62 and 63 was created by means of etching or burning by means of burning away along a helical path using a laser beam. One sensor element is present between the terminals 61 and 62 and the other sensor element is present between the terminals 62 and 63. The width b of the nickel path was 50 micron. The response time to reach 98% of the ultimate value after a stepwise change from 20% to 100% in the fluid flow rate was between 100 and 200 msec.

Figure 7A:
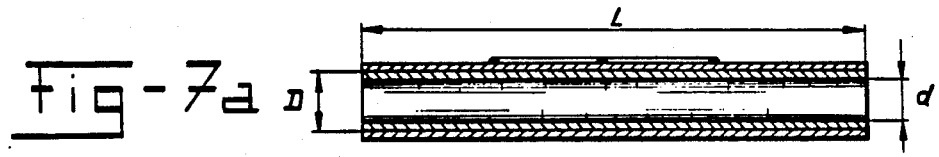
Figure 7B:
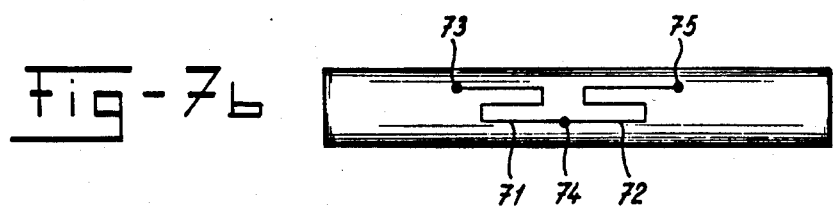
Figure 7C:
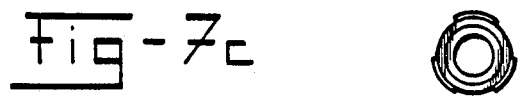

FIGS. 7a, 7b and 7c illustrate a third embodiment which was tested in practice. In this embodiment the measuring channel was a stainless steel tube having a length L of 60 mm, an outer diameter of D of 2.0 mm and an inner diameter d of 1.9 mm. Said stainless steel tube was covered over its complete length with an enamel layer having a thickness of 10-20 micron. Thereafter a pattern of nickel resistors was deposited onto said enamel layer by means of screen printing. However, within the scope of this embodiment it is also possible to use another thin film technique. As is shown in FIG. 7b also in this case the sensor elements 71 and 72 are folded into a meander shape between the respective terminals 73 and 74, and 74 and 75. As is schematically indicated in FIG. 7c this pattern of sensor elements was repeated three times, spaced at equal distances on the outside wall of the measuring channel. In this embodiment the response time to reach 98% of the ultimate value after a stepwise change of the fluid flow rate from 20% to 100% was between 100 and 200 msec.

Although in the figures only combinations of two sensor elements and/or heater elements are illustrated it is preferred that all the elements of the bridge circuit into which said sensor elements are connected, are formed in the illustrated way directly onto the fluid measuring channel. Preferably the bridge circuit is embodied as is very schematically illustrated in FIG. 8. The bridge circuit is made of four resistors $R_1$, $R_2$, $R_3$ and $R_4$, preferably all of the same resistance value and made of the same resistance material. In fluid flow direction the resistors $R_1$ and $R_3$ are positioned onto a upstream section of the fluid flow measuring channel and the resistors $R_2$ and $R_4$ are positioned onto a downstream section of the fluid flow channel. The resistors are for instance embodied as is schematically illustrated in FIG. 6. A more detailed illustration is presented in FIG. 9. The resistors $R_1$ and $R_2$ are formed into one spiral pattern and the other resistors $R_3$ and $R_4$ are formed into a second interleaved spiral pattern. The connecting points 81, 82, 83, 84, 85, 86 indicated in FIG. 8 are also indicated in FIG. 9.

I claim:
1. A fluid flow measuring device comprising:
   (a) an elongated channel to contain the fluid flow being measured, said channel comprising a thin wall permitting good thermal conductance thereacross;
   (b) a plurality of temperature sensitive electrical resistance elements integral with an electrically insulative substrate having a high thermal conductivity, said substrate being positioned at the outside surface of said channel wall, a first said resistance element being positioned upstream from a second said resistance element;
   (c) means to heat at least one said resistance element, a temperature differential representative of said fluid flow thereby being created between said first resistance element and said second resistance element; and
   (d) means to generate an electrical signal representative of said temperature differential.
2. The device of claim 1 wherein said heating means comprises a means for flowing a current through a said resistance element.
3. The device of claim 1 wherein said heating means comprises a heater element separate from said resistance elements, integral with said substrate.
4. The device of claim 1 wherein said substrate comprises a thin layer of aluminum oxide.
5. The device of claim 1 or claim 4 wherein said substrate is attached to said outer channel wall by means of a thin layer of thermally conductive adhesive.
6. The device of claim 1 or claim 4 wherein said substrate comprises a thin layer of material deposited on said channel wall.
7. The device of claim 1 wherein said substrate comprises at least a part of said channel wall.
8. The device of claim 7 wherein said substrate comprises a groove on the side opposite said resistor elements, said groove defining a portion of said channel.
9. The device of claim 7 wherein a generally U-shaped element is positioned against the substrate such that the flow path comprises the resulting closed space within the U-shaped element.
10. The device of claim 7 wherein said channel is electrically insulative and functions as said substrate.
11. The device of claim 1 further comprising an insulating enclosure insulating said temperature dependent resistor elements from the ambient atmosphere, said insulating enclosure comprising a layer of fibers.
12. The device of claim 11 wherein said natural fibers comprise glass wool fibers or rockwool fibers.
13. The device of claim 1 wherein said electrical signal generating means comprises a bridge circuit comprising four said temperature sensitive resistance elements, said first resistance element being connected in series with said second resistance element, and a third said resistance element being connected in series with a fourth resistance element, said first and third elements being positioned at a first channel section upstream from a second channel section, said second and fourth elements being positioned at said second channel section, the downstream end of said second element being connected to the upstream end of said third element and the downstream end of said fourth element being connected to the upstream end of said first element, said electrical signal representative of said differential being generated between two points, the first said point being in the connection between said first and said second elements and the second said point being in the connection between said third and said fourth elements.

14. The device of claim 13 further comprising an insulative body to thermally insulate said resistance elements from the ambient environment.

15. The device of claim 14 wherein said heating means comprises heating resistance elements and a means to conduct a constant electrical current through said heating resistance elements, said heating resistance elements comprising an electrically resistive material, said resistive material and said insulating body being selected such that the heat released by said heating resistance elements with increasing temperature of said fluid's ambient temperature will be at least approximately compensated by the increase in heat loss through said body.

16. The device of claim 1 or claim 11 wherein said temperature-sensitive electrical resistance elements comprise thin or thick film resistors of temperature sensitive material applied to said substrate, said substrate being bonded to the outer wall of said channel.

17. The device of claim 16 wherein said substrate is a foil material and electrically resistive material present on said foil is etched to form said temperature-sensitive electrical resistance elements.

18. The device of claim 16 wherein electrically resistive material present on said foil is etched to form said means to heat.

19. The device of claim 1 wherein said signal generating means comprises electrical components positioned on said substrate.

20. The device of claim 1 wherein said resistance elements are formed into a semiconductor chip positioned on said substrate.

21. The device of claim 20 wherein said semiconductor chip is bonded to said chamber wall by an adhesive, said adhesive and said chip material forming said substrate.

22. The device of claim 1 wherein said resistance elements are thin-layer resistors positioned on said substrate.

23. The device of claim 1 wherein said substrate comprises a thin layer of electrically insulating, heat conducting material formed on the outer wall of said channel.

24. The device of claim 23 wherein the substrate is formed on said channel wall by sputtering, vacuum deposition, or deposition within a galvanic bath.

25. The device of claim 23 wherein said substrate comprises a thin enamel layer formed by an enameling process.

26. The device of claim 23 wherein said temperature sensitive electrical resistors comprise resistance material applied to said substrate by vacuum deposition, sputtering, or deposition in a galvanic bath, said resistance material thereafter being removed locally by means of etching or by laser cutting to obtain the desired resistor change.

27. The device of claim 1 wherein the fluid flow measuring channel comprises aluminum, and said substrate comprises a layer of aluminum oxide formed on said channel, the sensor elements being applied in the form of a thin or thick film on said substrate.

28. The device of claim 1 wherein said device comprises measuring circuit components, said means to heat and said circuit components are applied in the form of a thin or thick film on said substrate.

29. The device of claim 1 wherein said temperature sensitive elements are formed by a screen printing process for depositing said resistive material in a desired pattern.

* * * * *